United States Patent [19]

Kuriyama

[11] Patent Number: 4,824,259
[45] Date of Patent: Apr. 25, 1989

[54] DUST SEAL ASSEMBLY FOR USE IN A CLOSED TYPE MIXER AND ITS CONTROL MECHANISM

[75] Inventor: Akimasa Kuriyama, Kobe, Japan
[73] Assignee: Kabushiki Kaisha Kobe Seiko Sho, Kobe, Japan
[21] Appl. No.: 183,278
[22] Filed: Apr. 11, 1988

Related U.S. Application Data

[63] Continuation of Ser. No. 855,672, Apr. 25, 1986, abandoned.

[51] Int. Cl.⁴ .................... F16J 15/34; B01F 7/08; B01F 15/00
[52] U.S. Cl. .................................. 366/349; 366/69; 277/81 R; 277/96.2
[58] Field of Search ................ 366/349, 71, 72, 73, 366/74, 75, 76, 77, 85, 69; 277/81 R, 96, 96.1, 96.2; 384/369, 921, 420, 421, 422, 424, 425, 426, 427

[56] References Cited

U.S. PATENT DOCUMENTS

| | | | |
|---|---|---|---|
| 1,946,366 | 2/1934 | Staaff | 384/369 |
| 1,987,659 | 1/1935 | Banbury | 277/81 X |
| 2,502,563 | 4/1950 | Goodchild | 366/85 X |
| 3,057,008 | 10/1962 | Hartmann et al. | 366/76 |
| 3,949,972 | 4/1976 | Bell et al. | 366/349 X |
| 3,976,285 | 8/1976 | Johnson | 366/349 X |
| 4,082,232 | 4/1978 | Brewer | 384/425 X |
| 4,412,747 | 11/1983 | Moriyama | 366/64 X |
| 4,413,918 | 11/1983 | Thomas | 384/420 X |
| 4,416,458 | 11/1983 | Takenaka et al. | 277/96.2 X |
| 4,455,091 | 6/1984 | Bamberger et al. | 366/77 X |
| 4,555,186 | 11/1985 | Scruggs | 384/912 X |
| 4,583,748 | 4/1986 | Weichenrieder, Sr. | 277/96.2 X |

FOREIGN PATENT DOCUMENTS 52-6161  1/1977  Japan.

Primary Examiner—Philip R. Coe
Assistant Examiner—Scott J. Haugland
Attorney, Agent, or Firm—Oblon, Fisher, Spivak, McClelland & Maier

[57] ABSTRACT

A dust seal assembly for a closed type mixer including a rotor shaft opening at least one end of a mixing chamber, a rotor shaft extending through the opening, a collar ring fitted on the rotor shaft for rotation therewith and closing the rotor shaft opening, and a fixed gland ring associated with the collar ring to impart a sealing pressure thereto, wherein the assembly includes: abrasion resistant members of super hard metals of different hardnesses attached to sliding portions of the collar ring and the gland ring, respectively, the abrasion resistant member on the gland ring being formed with a forwardly tapered shape in section.

4 Claims, 3 Drawing Sheets

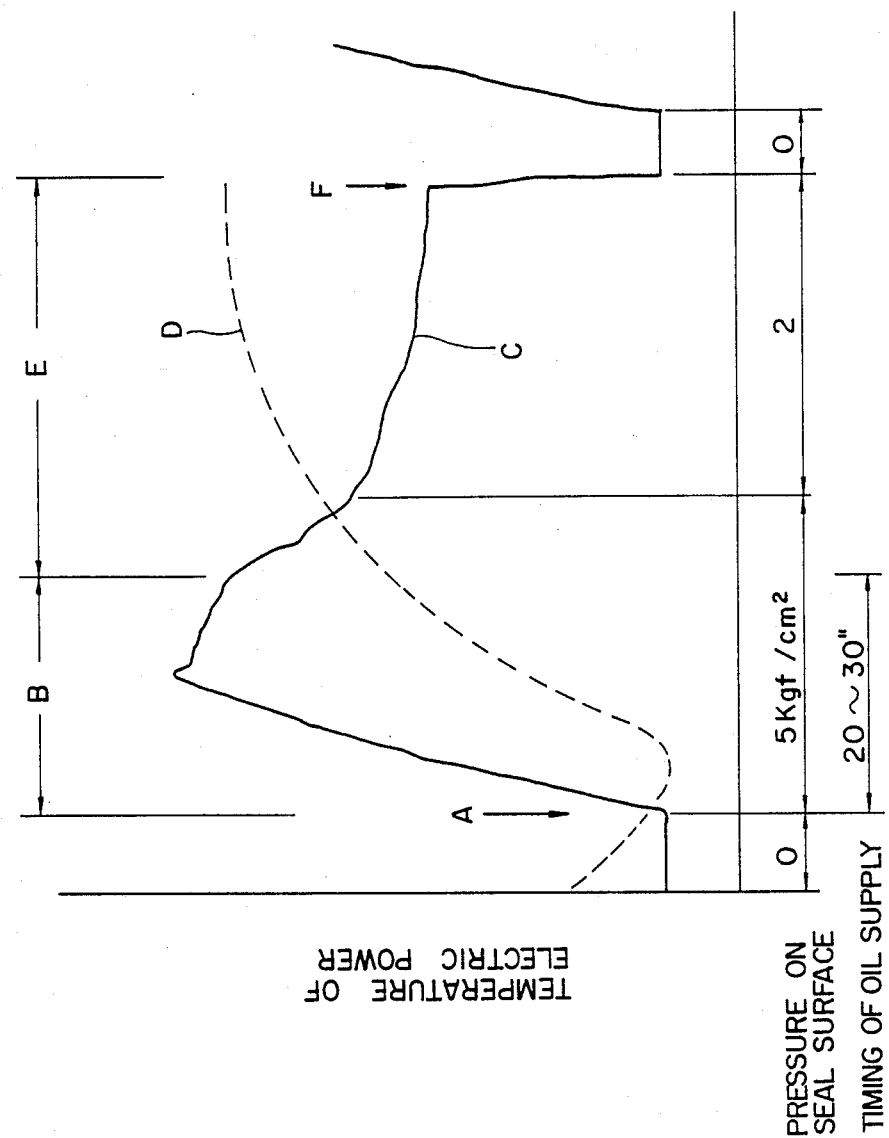

4,824,259

DUST SEAL ASSEMBLY FOR USE IN A CLOSED TYPE MIXER AND ITS CONTROL MECHANISM

This application is a continuation of application Ser. No. 855,672, filed on Apr. 25, 1986, now abandoned.

BACKGROUND OF THE INVENTION

1. Field of the Invention

This invention relates to a dust seal assembly for closed type mixer, its control mechanism.

2. Description of the Prior Art

The dust seal assemblies which have thus far been accepted for use in the art are described, for example, in Japanese Patent Publication No. 49-27895 and Japanese Patent Publication No. 46-27117.

More specifically, the former publication describes a dust seal for a mixer, which is constituted by a floating ring interposed between an end plate and a rotor, and a wear ring with a separately formed facing, assembling the floating ring and facing through sliding surfaces of a material which can endure sliding action in a non-lubricated or almost non-lubricated state. The wear ring is supplied with a temperature adjusting fluid and provided with an outlet for discharging an internally stagnant material. This dust seal has a sufficiently long service life without lubrication or with a slight degree of lubrication.

The former publication sets forth a disclosure with regard to application of lubricant oil to the sliding surfaces of the floating ring and facing, but contains no indications concerning the timing of oiling or particular means of lubrication. That is to say, such focuses on minimize of oil consumption but gives no considerations to the degree or condition of mixing which is very important. In addition, such publication gives no consideration to the utilization of seal surface control means.

In the second publication, arrangements are disclosed to operate a dust seal yoke by a controllable hydraulic pressure transmission for the purpose of controlling the sealing pressure. Although a pressure regulator valve is provided in its hydraulic circuit, it is operated regardless of the degree of mixing.

As is known in the art, the load of a mixer varies from time to time in the initial and final stages of a mixing operation, as a result varying the sealing surface pressure and temperature. Therefore, it is difficult to secure the desired functions of a dust seal assembly by supplying oil or controlling the sealing pressure regardless of these variations.

Moreover, actually used mixers require the replacement of wornout parts. On such occasions, it is difficult to replace movable component parts although replacement of parts on the fixed side is relatively easy.

SUMMARY OF THE INVENTION

In view of the foregoing discussions, it is an object of the present invention to provide a dust seal assembly and its control mechanism, which permits the reduction of oil consumption to a minimum amount.

It is another object of the present invention to prolong the service life of a dust seal assembly, thus reducing the number of parts to be replaced at the time of overhauling.

It is a further object of the invention to provide a dust seal assembly of a simplified construction which is adapted to suppress heat generation in seal portions.

In accordance with a fundamental aspect of the present invention, there is provided a dust seal assembly for a closed type mixer including a rotor shaft opening at least at one end of a mixing chamber, a rotor shaft extending out through the rotor shaft opening, a collar ring fitted on the rotor shaft for rotation therewith, and a gland ring associated with the collar ring to apply sealing pressure thereto, characterized in that the dust seal assembly comprises antiabrasion members of super hard metal of different hardness attached to the collar ring and gland ring, respectively, the anti-abrasion member on the gland ring being formed with a forwardly tapered shape in section.

The above and other objects, features and advantages of the invention will become apparent from the following description and the appended claims, taken in conjunction with the accompanying drawings, which show by way of example a preferred embodiment of the invention.

BRIEF DESCRIPTION OF THE DRAWINGS

In the accompanying drawings:

FIG. 3 is a graph showing variations in mixing conditions.

DESCRIPTION OF PREFERRED EMBODIMENTS

Figure 1:
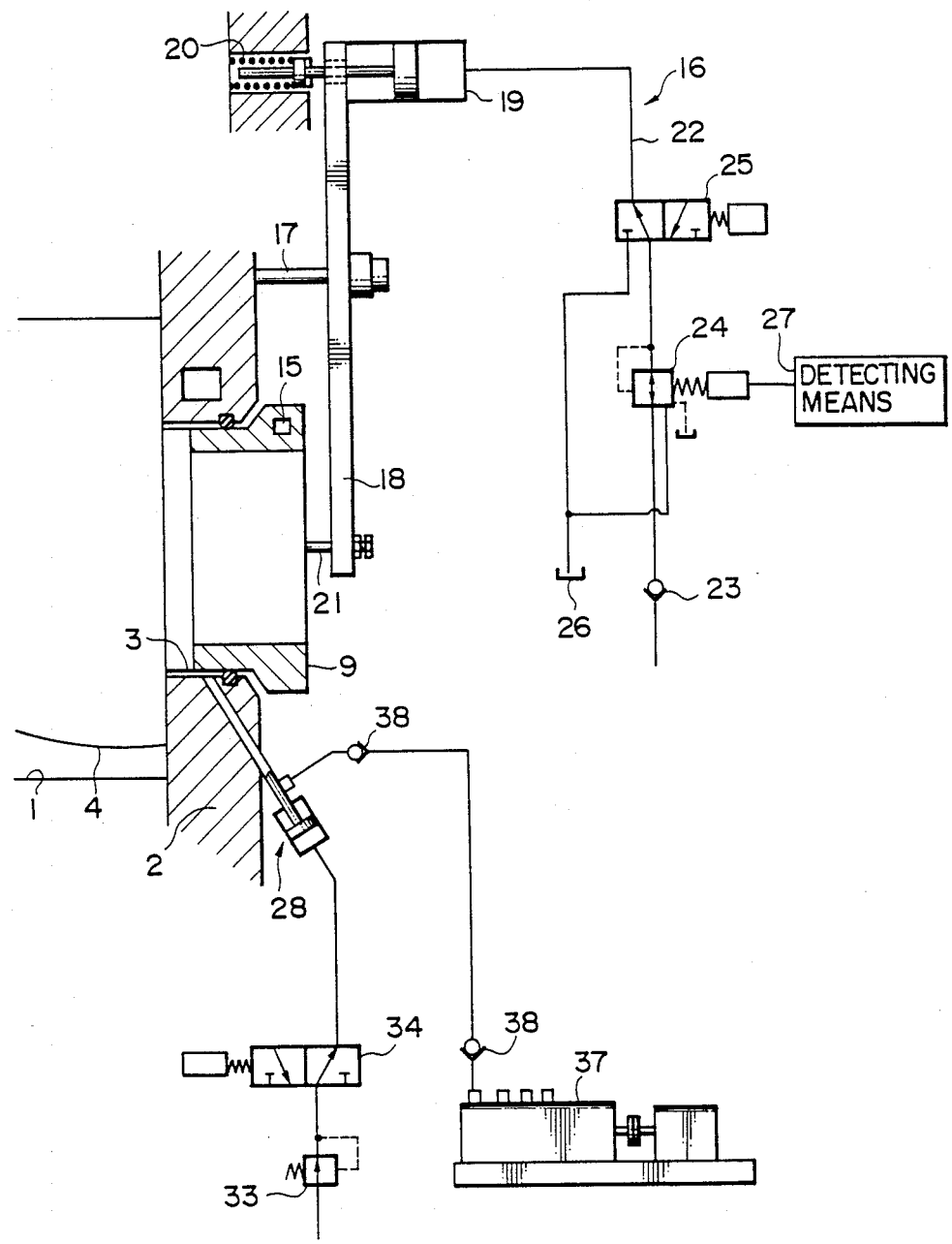
FIG. 1 is a diagrammatic view of a control system according to the present invention.
Figure 2:
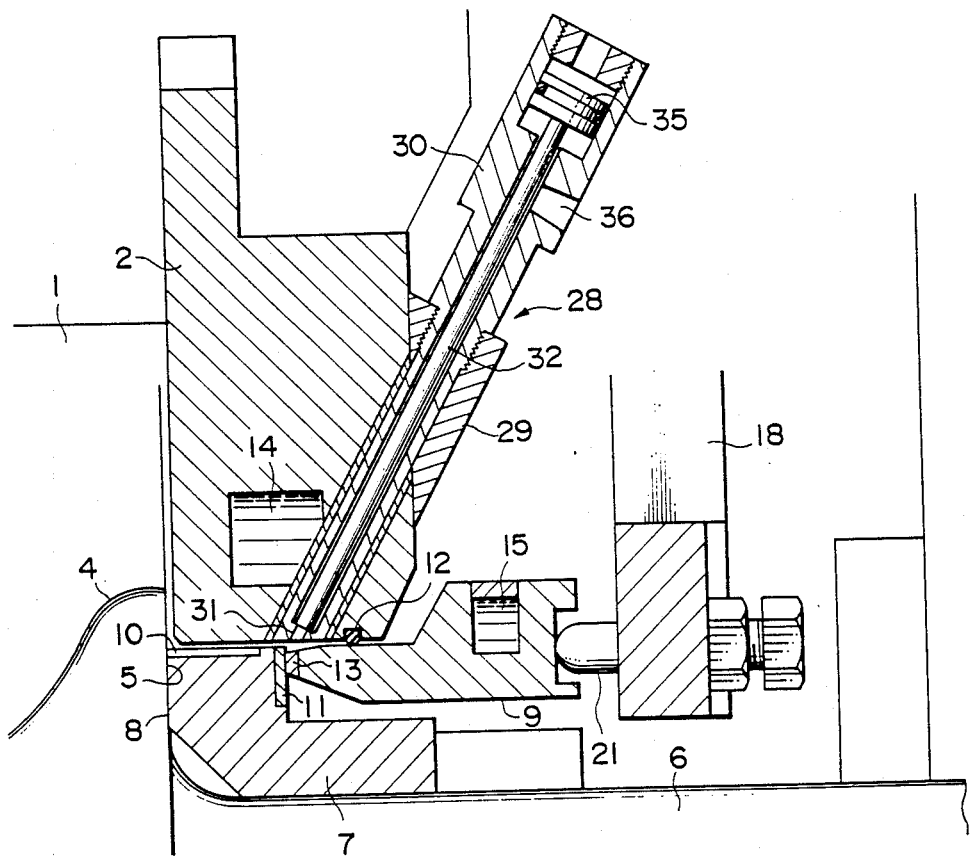
FIG. 2 is a diagrammatic sectional view of a dust seal assembly according to the present invention.

Referring to FIGS. 1 and 2, designated at 1 is a mixing chamber which is provided with a rotor shaft opening 3 in an end plate 2 located at at least one end of the chamber. Indicated at 4 is a rotor which is inserted in the mixing chamber 1 and driven by a reduction gear drive mechanism, (not shown), for mixing a charged material in the mixing chamber 1, for example, a material such as rubber, carbon or the like.

The rotor 4 has a provided with a flange 5 which is minimized diameter to reduce the pressure raise by weissenberg effect and, contiguously on the outer side of the flange 5, a rotor shaft 6 is provided which is projected through the rotor shaft opening 3. Reference numeral 7 denotes a unitary collar ring which has a radially projecting flange portion 7' and which is fixedly fitted on the rotor shaft 6 and which has its press ring face 8 pressed against the flange 5 through a gland ring 9. The collar ring 7 is formed with a groove 10 on the circumference thereof and has a ring plate 11 fixedly attached to collar ring 7 to form a unit and which comprises a super hard metal of 770–850 HV (Vicker's hardness) fixedly attached to a sealing surface in sliding contact with the gland ring 9.

The gland ring 9 is fitted in the end plate 2 through an O-ring 12 and has a ring tip 13 of an super hard metal of 590–680 HV (Vicker's hardness) and of a forwardly tapered shape in section fixed to its inserted distal end, forming a sealing surface in cooperation with the end ring plate 11. In this instance, the annular end plate 11 which is mounted on the rotating side is made of an alloy of a higher hardness than that of the ring tip 13 to deter its abrasive wear and reduce the frequency of its replacement which is more difficult than the latter. The end plate 2 and gland ring 9 are internally provided with an annular cooling water jackets 14 and 15, respectively.

Designated at 16 is a hydraulic pressing mechanism, including a dust seal yoke 18 which is pivotally supported on the fixed side through a yoke pin 17, and a hydraulic cylinder 19. As the hydraulic cylinder 19 is actuated against a mechanical spring 20, a press pin 21 which is mounted on the yoke 18 presses the gland pin 9 in the leftward direction in the drawing. The press pin 21 is mounted on each one of bifurcated portions of the yoke 18, its position being fixably adjustable through a screw system.

Indicated at 22 is a hydraulic pressure supply circuit which supplies hydraulic pressure from a pump, (not shown), to the cylinder 19 through a check valve 23 and a proportional electromagnetic reducing valve 24. The oil which is pushed back by the spring 20 is returned to a tank 26.

A detection means designated at 27 controls the reducing valve 24 in such a manner as to raise the oil pressure in an initial stage of mixing or when a large amount of powder exists in the mixing chamber and to lower the oil pressure at a time point when the kneading operation in the last stage of mixing has progressed to some extent or under a non-loaded state. The detection means 27 is constituted, for example, by a mixing temperature detector, a timer and a wattmeter.

More specifically, as shown in FIG. 3, since a large amount of powder exists during an initial mixing stage B in which the rotor is in a rotation mode after charging of the material indicated at A, the power C and temperature D are at high levels. As the mixing of the powder progresses and the material is softened by kneading, the power level drops through a last mixing stage E and toward a discharging point F. Thus, the mixing conditions vary from time to time, and, in order to cope with these variations, the sealing surface pressure in the initial mixing stage B is maintained, for example, such as at 5 kgf/cm$^2$ while altering the liquid pressure to 2 kgf/cm$^2$ in the last mixing stage E on the basis of the detected power and temperature or in cooperation with a timer.

Indicated at 28 is an intermittent oil feed mechanism, including an injection nozzle 30 which is mounted on the end plate 2 through a sleeve 29, the nozzle tip 31 of the injection nozzle 30 being directed toward the sealing surface. A plug 32 is inserted into the nozzle 30 to feed air under a pressure of, for example, 5 kgf/cm$^2$ to a piston 35 of the plug 32 through a relief valve 33 and a electromagnetic change-over valve 34.

The nozzle 30 is provided with an oil inlet 36 in a longitudinally intermediate position to feed lubricant oil from a hydraulic pump 37 to the nozzle 30 through a check valve 38. Accordingly, in the initial mixing stage B of FIG. 3, the oil is supplied to the sealing surface in a time period of 20-30" in this particular embodiment, closing the plug 32 except for that time period.

In the foregoing embodiment, the end plate 2 and gland ring 9 have small sliding areas and are provided with water jackets 14 and 15 to suppress heat generation while a material such as rubber, carbon or the like is mixed by the rotor 4 in the mixing chamber 1, thereby preventing elevation of the sealing surface temperature which would invite drops in viscosity of the lubricant oil and local heat generations. The oil is supplied by the intermittent oil feed mechanism 28 in the initial mixing stage where the sealing condition is impaired by the existence of a large amount of powder, while the sealing surface pressure is controlled by the hydraulic pressure control means in association with the detection means 27, namely, by the reducing valve 24 in the particular embodiment shown.

As is clear from the foregoing description, according to the present invention, the sealing surface pressure is controlled by detecting the mixing condition which varies incessantly, holding the amount of oil consumed to a minimum. The oil consumption by the intermittent oil feed mechanism is also reduced, thus permitting cutting of the operation cost to a significant degree and facilitating the treatment of the exhaust oil.

The reduction of oil consumption also contributes to elimination of the possibilities of the product quality being degraded by the oil which creeps into the mixing material. Thus, the control mechanism of the invention brings about great advantages for the dust seal assembly of a closed type mixer.

Further, the dust seal assembly of the invention employs in its sliding portion a collar ring and a gland ring of super hard metals which are different in hardness, so that the service life of the assembly can be prolonged considerably, and replacement of parts at the time of an overhaul can be facilitated.

Obviously, numerous modifications and variations of the present invention are possible in light of the above teachings. It is therefore to be understood that within the scope of the appended claims, the invention may be practiced otherwise than as specifically described herein.

What is claimed is:

1. A dust seal assembly for a closed type mixer, having a mixing chamber, comprising:
    a rotor shaft opening at at least one end of said mixing chamber;
    a rotor shaft extending through said opening and which includes a flange;
    a unitary collar ring fitted on and engaging said rotor shaft for rotation therewith and having a radially projecting flange portion which includes a ring plate sliding portion for closing said rotor shaft opening and a press ring face portion located opposite said ring plate sliding portion;
    a fixed gland ring positioned radially outwardly of said collar ring for engaging with said radially projecting flange portion of said collar ring and having a ring tip portion located opposite said ring plate sliding portion for imparting sealing pressure thereto and for pressing said press ring face portion against said flange of said rotor shaft;
    means for detecting mixing conditions in said mixer;
    variable pressing means for applying a variable controlled pressure to said gland ring in response to detected mixing conditions in said mixer; and
    abrasion resistant members of a hardness of 770-850 HV attached to said ring plate sliding portion of said collar ring and of a hardness of 590-680 HV attached to said tip portion of said gland ring, respectively, the abrasion resistant member of said gland ring being formed with a forwardly tapered shape in section.

2. The dust seal assembly as set forth in claim 1, wherein said collar ring has a groove formed on the circumference thereof.

3. A control mechanism for a dust seal assembly of a closed type mixer, having a mixing chamber, comprising:
    a rotor shaft opening at at least one end of said mixing chamber;

a rotor shaft extending through said rotor shaft opening;

a collar ring fitted on said rotor shaft and having a ring plate portion for closing said rotor shaft opening;

a tapered gland ring associated with said collar ring and having a tip portion for imparting a sealing pressure to said ring plate portion of said collar ring; and a hydraulic pressing mechanism for applying a controlled pressure to said gland ring through a dust seal yoke wherein said dust seal assembly comprises:

an intermittent oiling mechanism adapted to feed oil to said ring plate portion of said collar ring and said tip portion of said gland ring in an initial mixing stage;

mixing condition detecting means for generating a signal; and hydraulic pressure varying means provided in a pressure supply circuit of said hydraulic pressing mechanism to vary the output pressure thereof on the basis of said signal from said mixing condition detecting means.

4. A dust seal assembly as set forth in claim 1, further comprising an intermittent oiling mechanism adopted to feed oil to said ring plate sliding portion of said collar ring and said tip portion of said gland ring.

* * * * *